March 8, 1938.  M. CORNELL  2,110,288
OIL TESTING MACHINE
Filed April 22, 1935  3 Sheets-Sheet 1
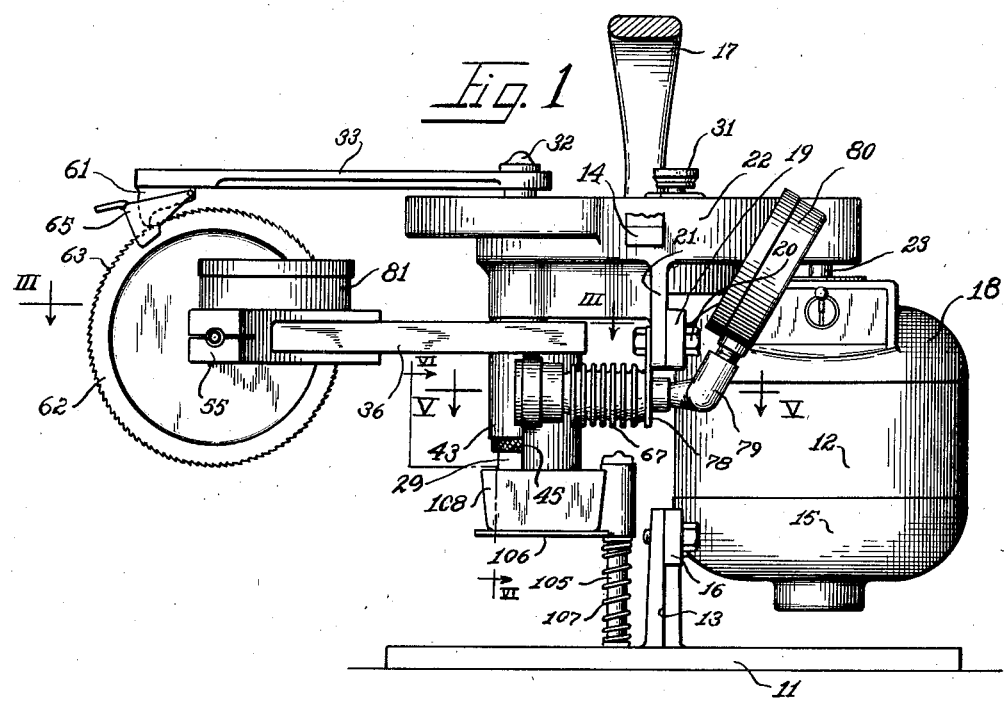
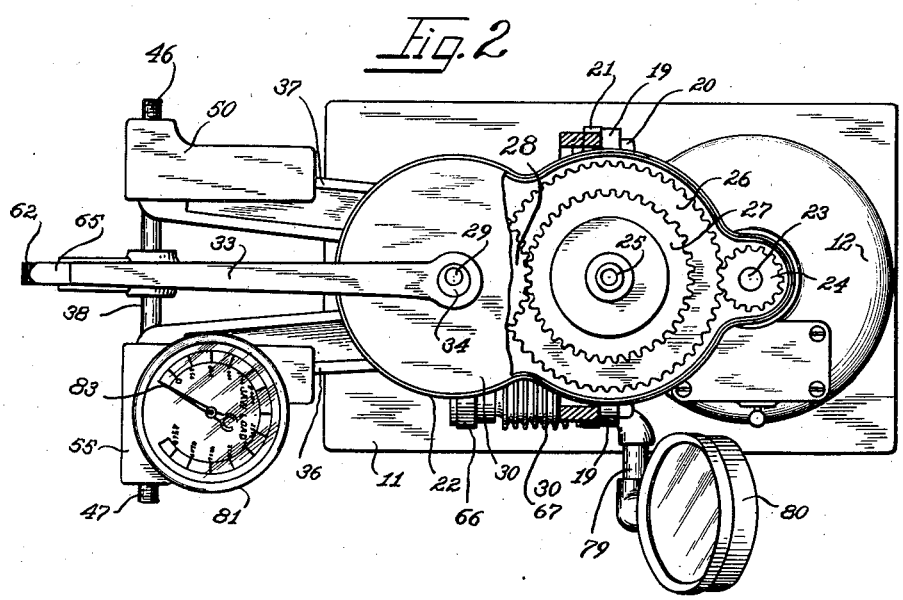
Inventor
Mead Cornell March 8, 1938.  M. CORNELL  2,110,288
OIL TESTING MACHINE
Filed April 22, 1935  3 Sheets-Sheet 2
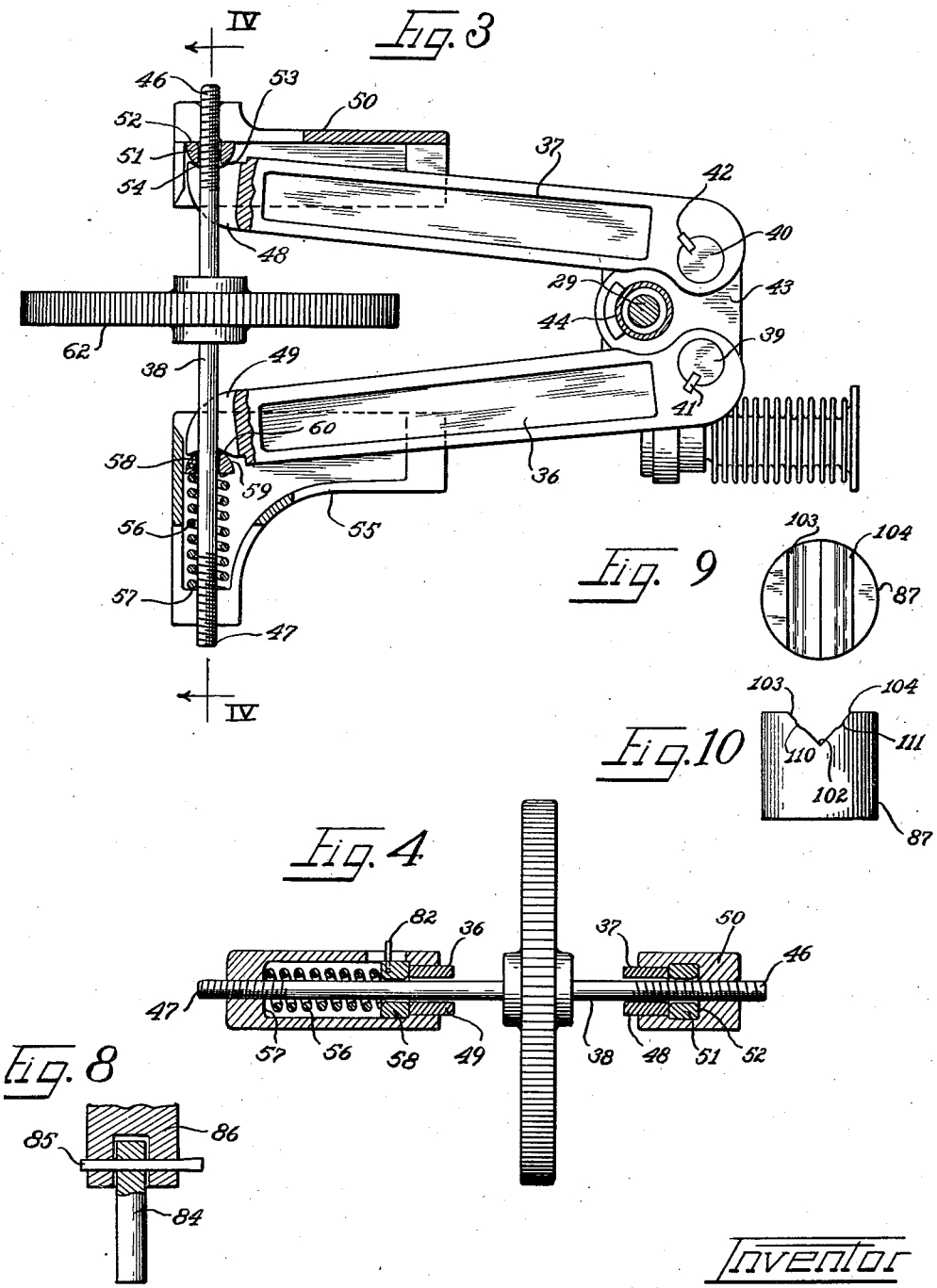
Inventor
Mead Cornell
by Charles H. Willis Attys

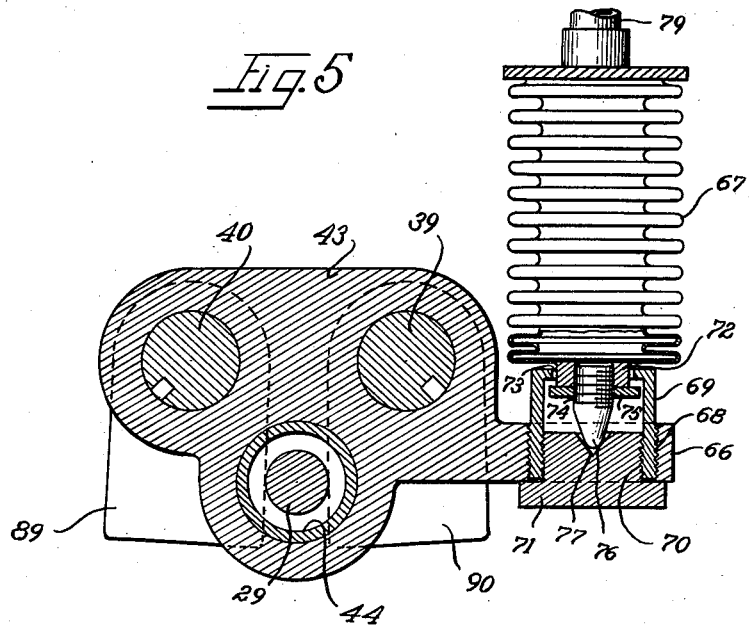
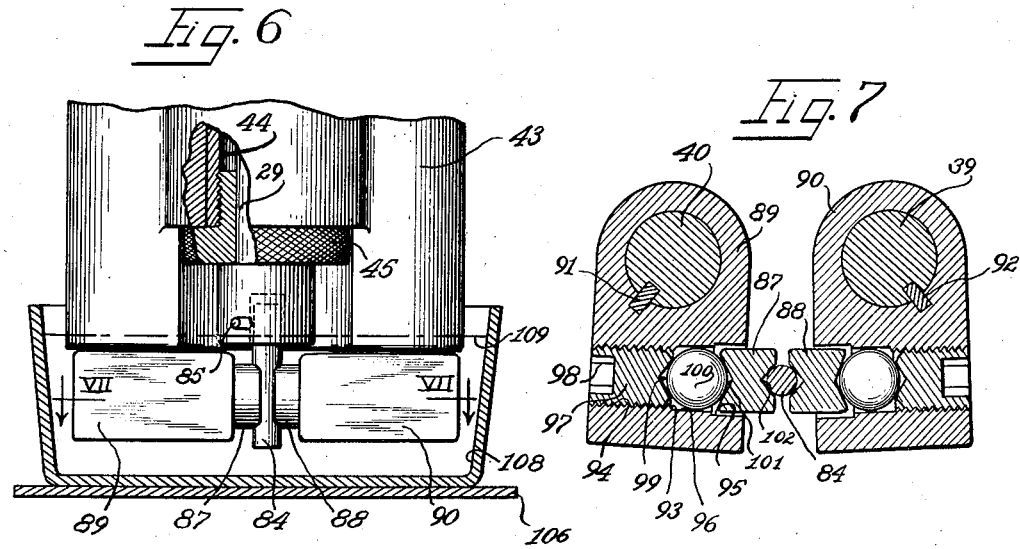

Patented Mar. 8, 1938

2,110,288

UNITED STATES PATENT OFFICE

2,110,288

OIL TESTING MACHINE

Mead Cornell, Philadelphia, Pa., assignor to F. A. Faville and J. R. Le Vally, Chicago, Ill., co-partners doing business as Faville-Le Vally Co.

Application April 22, 1935, Serial No. 17,581

22 Claims. (Cl. 265—10)

This invention relates to a lubricant testing machine. More particularly the invention relates to a machine for testing lubricants that is capable of indicating both the load applied to the bearing surfaces and also the torque produced by the friction between the relatively rotating surfaces of the bearing members.

It is an object of this invention to provide a machine of a compact, rugged and relatively simple construction, yet so designed as to be capable of a high degree of flexibility and accuracy in the determination of the lubricating values of various oils and the like.

It is a further important object of this invention to provide a lubricant testing device in which the load applied to the bearing surfaces is indicated directly and in which the variations in the effect of structural parts of the machine upon the reading of the load are automatically compensated for.

It is a further important object of this invention to provide a novel and improved type of bearing block and pin for use in the machine of my invention.

It is a further important object of this invention to provide means and mechanism for applying a load to the bearing surfaces by successively applied small increments.

It is a further important object of this invention to provide a lubricant testing machine in which the speed of the bearing pin may be readily changed.

It is a further important object of this invention to provide a lubricant testing machine in which a bearing pin is revolved in a vertical position in bearing relationship to opposed bearing blocks having convergent plane faces for contact with the pin.

It is a further important object of this invention to provide a machine for testing lubricants, wherein bearing blocks used for applying the bearing pressure are self-adjusting to eliminate unbalanced pressure conditions.

Other and further important objects of this invention will become apparent from the following description, the drawings and the appended claims.

On the drawings:

Figure 1 is a side elevational view of a lubricant testing machine embodying the principles of my invention.

Figure 2 is a top plan view of the same, with parts broken away to show the driving gears.

Figure 3 is an enlarged sectional view taken substantially on line III—III of Fig. 1, with parts in elevation.

Figure 4 is a sectional view taken substantially on line IV—IV of Fig. 3, with parts in elevation.

Figure 5 is an enlarged sectional view taken substantially on line V—V of Fig. 1, with parts omitted.

Figure 6 is a fragmentary, enlarged view, taken substantially along the line VI—VI of Fig. 1, with parts in section.

Figure 7 is a sectional view taken substantially along the line VII—VII of Fig. 6, with parts in elevation.

Figure 8 is an enlarged detail view of the bearing pin assembly.

Figures 9 and 10 are end view and elevational view, respectively, of a bearing block used in the machine of my invention.

As shown on the drawings:

The reference numeral 11 indicates a base or supporting stand on which apparatus embodying the principles of my invention is supported. An electric motor 12 is suitably supported from said base 11 by means of a pair of upright members 13—13, to which a lower section 15 of the motor casing is bolted, as at 16—16. An upper section 18 of the motor casing is similarly provided with integrally formed lugs 19—19, which are secured by means of bolts 20—20 to dependent lugs 21—21 formed on a gear casing or housing 22.

Said motor 12 is provided with a drive shaft 23 carrying a pinion gear 24 secured thereto. A stub shaft 25, suitably journaled in the gear casing 22, has secured thereto a pair of gears, comprising a gear 26 meshing with the pinion gear 24 and another gear 27 that meshes with a gear 28 on a stub shaft 29. The gears 27 and 28 are interchangeable, or may be replaced by other pairs of gears of varying numbers of teeth, so that the speed may be varied as desired. Either metal or fiber gears may be used, or combinations thereof, to reduce the noise of the drive mechanism.

A cover plate 30 is adapted to be capped on to the gear housing 22 to enclose the various gears, and for this purpose is provided with apertures for receiving the stub shafts 25 and 29. A removable pin 31 threads into the stub shaft 25 to hold the cover 30 in place. A nut 32 is adapted to be threaded over the upper end of the stub shaft 29 for holding a lever arm 33 in engagement with an eccentric disk 34 mounted on said shaft 29. Said arm 33 may be removed by merely unscrewing the nut 32.

The casing 22 may also be provided with laterally extending lugs 14, with which is engaged a handle or bail 17. The lugs 14 are placed at approximately the center of mass of the apparatus so as to permit the machine to be carried by means of the bail 17.

The bearing load applying mechanism comprises a pair of lever or jaw arms 36 and 37, which together constitute a jaw, and a transversely extending shaft 38, by means of which a load is applied to said levers 36 and 37 and by them transmitted to the bearing surfaces. Said lever arms 36 and 37 are securely fixed upon stub shafts 39 and 40, respectively, by means of keys 41 and 42. Said stub shafts 39 and 40 are oscillatably disposed within a block or housing 43, which is oscillatably mounted upon a cylindrical tube 44 that houses the shaft 29, the upper end of said tube 44 being force fitted or otherwise secured within the casing 22. A knurled bearing collar 45 is threaded into the lower end of the tube 44 to form a bearing support for the block 43.

The transverse shaft 38 is provided with threaded ends 46 and 47 that extend freely through bifurcated ends 48 and 49 on the lever arms 37 and 36, respectively (Fig. 3). The threaded end 46 extends through and is in threaded engagement with a member 50 that partially encloses the end 48 of the lever arm 37. A bearing member 51 having a plane surface 52 for engagement with an inner face of the member 50 and a segmental spherical surface 53 for engagement with a segmental spherical surface in the bifurcated end 48, is disposed between said member 50 and the bifurcated end 48. Said bearing member 51 thus serves to transmit the load to the lever arm 37 without causing binding between the engaging surfaces.

An angular, hollow member 55 is positioned on the threaded end 47 in threading engagement therewith and partially enclosing the bifurcated end 49 of the lever 36. A helical spring 56 surrounds the portion of the shaft 38 between an engaging face 57 of the member 55 and a bearing member 58. This bearing member 58 is provided with a segmental spherical surface 59 for engagement with a correspondingly formed surface 60 in the bifurcated end 49. The load is thus applied through the spring 56 and the bearing member 58 to the bifurcated end 49 of the lever 36.

The load applying lever 33 carries at its free end a dog or pawl 61 which is normally in gravity engagement with the teeth 63 of a ratchet wheel 62 fixedly secured on the shaft 38. It will be apparent that when the motor 12 is driven to rotate the shaft 29, the eccentric throw of the disk 34 will effect a reciprocating movement of the load applying arm 33, so that the wheel 62 will be caused to rotate by the engagement between the pawl 61 and the teeth 63. A pivotally mounted trip member 65, positioned adjacent the end of the load applying arm 33 serves for manual adjustment of said arm 33 to swing the pawl 61 out of engagement, or into engagement with the ratchet wheel 62.

The housing 43 (Fig. 5) is provided with a laterally extending eye lug 66 for connection to a sylphon 67. Said eye lug 66 is internally threaded, as at 68, for engagement with the threaded end of a connecting member 69. The connecting member 69 is internally threaded as at 70 to receive a flanged plug 71, which secures the connecting member 69 in the eye lug 66. The sylphon 67 is provided with an end boss 72 that extends through an opening 73 in the connecting member 69. A pressure transmitting plunger 74 is threaded into said end boss 72 and held therein by means of a lock washer 75. Said plunger 74 is provided with a conically shaped, rounded end 76 centered in a conically shaped depression 77 in the plug 71.

The other end of the sylphon 67 passes through a yoke 78 (Fig. 1) suspended from the gear housing 22 by means of one of the bolts 26. A tube 79 connected to the interior of said sylphon 67 extends beyond said yoke 78 to a gauge 80 which is calibrated to read the torque directly in inch pounds. The sylphon 67 and tube 79 are, of course, filled with a fluid, such as oil, glycerine, or the like, for transmitting the pressure to the working mechanism of the gauge 80.

A second gauge 81 is operatively connected to the load applying mechanism by means of a pin 82 (Fig. 4) carried by the bearing block 58. Said pin 82 actuates the working mechanism of the gauge 81 to cause the pointer 83 of said gauge to show the jaw load in pounds. Before the spring 56 is inserted in place, it is calibrated to determine the amount of deflection produced by a given load acting to compress the spring. The gauge 81 is correspondingly calibrated to show the load placed upon the jaw arms 36 and 37 and by them transmitted to the bearing surfaces. All deflection of said arms 36 and 37, as by bending, is thus automatically compensated for, since the gauge 81 indicates directly the compressive load put upon the spring 56.

The driven shaft 29 carries at its lower end a bearing pin 84 (Fig. 6) secured therein by means of a shear pin 85 that extends through the apertured end 86 of said shaft 29 and also through an aperture in said bearing pin 84. Pressure is applied to said bearing pin 84 by means of bearing blocks 87 and 88 (Fig. 7) carried by bearing block holders 89 and 90, respectively. Said bearing block holders 89 and 90 are secured, as by means of keys 91 and 92, upon the lower ends of the shafts 40 and 39, respectively.

Since the bearing block holders 89 and 90 are substantially identical, only one of them will be described. The bearing block holder 89, for instance, is provided with a transverse bore 93, which is threaded, as at 94, inwardly from one end and provided with a counterbored socket 95 at the other end, with a connecting smooth bore portion 96. A plug 97 is adapted to be threaded into the threaded bore portion 94 by means of a wrench (not shown) adapted to fit within the polygonal socket 98 in the outer end of the plug. The inner end of said plug 97 is provided with a conical recess 99, which serves to center a ball 100 snugly held within the smooth bore portion 96 and in engagement with said recess 99. The bearing block 87 associated with the bearing block holder 89 is similarly provided with a conically recessed end 101 so as to make the block self-centering about the ball 100. To this end, the block 87 is of slightly smaller dimensions than the counterbored recess 95, thereby permitting the block to be self-adjusting.

Each of the bearing blocks 87 and 88 has a V-shaped notch 102, providing converging plane surfaces 103 and 104 (Figs. 9 and 10) for line engagement with the cylindrical surface of the bearing pin 84. As previously stated, the provision of the conical recesses in the inner ends of the bearing blocks 87 and 88 and of the balls 100 cause the bearing blocks 87 and 88 to be self-adjusting, so that centers of the balls 100 and the axis of the pin 84 will always be in the same plane and the bearing forces acting against the pin 84 consequently will be properly balanced.

Means are provided for maintaining the bearing blocks 87 and 88 and the portion of the bearing pin 84 encompassed thereby beneath the surface of a lubricant to be tested. Such means include a post 105 (Fig. 1) on which is slidably and pivotally supported a platform 106. A spring 107 normally holds the platform 106 in elevated position. On the platform 106 is mounted a tray 108 for containing the lubricant to be tested. The normal level of the lubricant within the tray 108 is indicated by the dotted line 109 (Fig. 6).

The operation of my lubricant testing machine is as follows:

Assuming that the machine has not been cleaned up after the last run, the operator first unscrews the nut 32 and swings the load applying arm 33 to one side so as to free the pawl 61 from the teeth of the ratchet wheel 62. The wheel 62 is then spun by hand until one end is unthreaded sufficiently to permit that end to be swung out through the bifurcated end 48 or 49 and the jaw levers 36 and 37 swung wide apart. Assuming that the shear pin 85 has been sheared in the previous operation, the pin is driven out of the shaft end 86 and a new bearing pin 84 inserted in the socket and a new shearing pin 85 positioned in place.

The old bearing blocks 87 and 88 will doubtless have fallen out, or they can be removed, and new bearing blocks inserted in place, the jaw lever arms 36 and 37 being manually swung back together to temporarily hold the bearing blocks in assembled relation about the bearing pin 84.

The tray 108 is next filled with the lubricant, to be tested, up to the level indicated by the dotted line 109 (Fig. 6), the tray placed upon the platform 106, while in depressed condition, and the platform then allowed to rise under the action of the spring 107 to the position indicated in Fig. 6.

The ratchet wheel shaft 38 is then swung into place and the wheel revolved in the proper direction to show an initial registration on the gauge 81. The load applying arm 33 is then swung into place with the pawl 61 engaging the teeth 63 of the ratchet wheel 62 and the nut 32 is screwed into position.

If at this point the gauges 81 and 80 do not stand with their pointers at zero, the ratchet wheel 62 is again properly manipulated to obtain this condition. If after a test and the machine is ready for another test, the pointer of the gauge 81 is not at zero, then the arm 33 is swung out of engagement with the ratchet wheel 62, the ratchet wheel is then rotated in such direction as to move the pointer of the gauge 81 to zero whereupon the arm 33 is moved into engagement with the ratchet wheel ready for another test. After a test and when the shaft 38 is disconnected from either of the arms 36 or 37, the housing or block 43 is relieved from the position to which it has been swung by a previous test, and it thereupon resumes its normal position by reason of the expansion of the bellows 67, after compression, whereupon the pressure of the fluid in the bellows and gauge 80 is relieved and the gauge pointer returns to zero. As already explained, when the gauge 81 registers zero, there is a slight compression of the spring 56, just sufficient to initiate bearing pressure between the bearing blocks 87 and 88 and the bearing pin 84. The motor 12 is then turned on and the test set in operation. The motor, of course, drives the shaft 29 through the train of gears 24—26 and 27—28. The eccentric throw of the disk 34 upon the shaft 29 is translated into a reciprocating movement of the load applying arm 33. On each movement in one direction the ratchet wheel 62 is rotated by the amount equivalent to the throw of the eccentric disk 34, or approximately such distance. The rotation of the ratchet wheel 62 causes the jaw arms 36 and 37 to be brought closer together, in step by step manner against the compressive force of the spring 56. As deflection of the spring 56 occurs, there is relative movement between the pin 82 mounted upon the bearing block 58 and the working mechanism of the indicator 81 that is securely affixed to the end member 55. Since, as already explained, the spring 56 has been calibrated with respect to the reading on the gauge 81, said gauge reads directly in pounds of pressure.

Practically as soon as the motor is started up, the indicator 80 starts to register the torque produced by the friction between the relatively moving surfaces of the bearing pin 84 and the bearing blocks 87 and 88. Since the bearing forces exerted by said blocks 87 and 88 against the bearing pin 84 are properly balanced, the only unbalanced force is that of friction between the relatively moving surfaces of the pin 84 and the plane faces 103 and 104. This frictional force produces a tendency for the block or housing 43 to revolve about the cylindrical tube 44 surrounding the shaft 29 that carries the bearing pin 84.

This tendency of the block 43 to rotate counter clockwise as viewed in Figure 5 causes a pressure against the plunger 76 as transmitted thereto through the plug 71 positioned in the eye lug 66 that is integral with said block 43. Owing to the conical bearing surfaces 76 and 77 of the plunger end and plug, respectively, a truly tangential force is applied through the plunger 74 to the bellows of the sylphon 67. This force is transmitted through the fluid with which the sylphon is filled to the gauge 80 and registers thereon directly in inch pounds of torque. The gauge 80 is, of course, one that has already been calibrated with reference to the sylphon 67.

As the test continues, both the jaw load and the torque load increase, the jaw load directly as the throw of the arm 33 applies successively increasing increments of pressure upon the jaw arms 36 and 37, which pressure is transmitted by said jaw arms 36 and 37 as bearing pressure between the contacting surfaces of the blocks 87 and 88 and the bearing pin 84. The temperature of the lubricant will naturally increase as the friction resulting from the increasing jaw load, also increases. The temperature of the lubricant is preferably measured by a thermometer, thermocouple, or the like, and a continuous record kept of the temperature.

The test may, or may not, be carried out until seizure occurs between the contacting surfaces of the bearing blocks and bearing pin. It may be desired merely to measure the torque produced under varying applied jaw loads. Ordinarily, however, the test is continued until seizure occurs and the shearing pin 85 is sheared off. For this purpose, the pin 85 is preferably made of some soft metal, such as brass, whereas the bearing pin 84 is of a high carbon steel. The bearing blocks 87 and 88 are also made of a relatively hard steel, the metallurgy of which is carefully controlled to give uniformity of hardness and structure in the bearing blocks used.

Where the test is continued until actual seizure occurs and the pin 85 is sheared, the readings of the gauges 81 and 80 at that point represent the jaw loads and torque loads when the lubricant is under the extreme pressure for the conditions under which the test is carried out, such as temperature and the like. The so-called "E. P." value for the particular lubricant can thus be expressed in terms of the jaw load and torque load at which the film of lubricant is ruptured and seizure occurs.

At the outset of the lubricant testing operation, there is merely line contact between the peripheral surface of the pin 84 and the converging plane surfaces 103 and 104 of the bearing blocks. As the pressure increases, there is a tendency of the high carbon steel pin 84 to wear away the surfaces of the bearing blocks and increase the area of contact therewith. Scored or worn places, as indicated at 110 and 111 (Figs. 9 and 10) are formed. If desired, the actual area of the scored portions 110 and 111 may be measured and the jaw load applied at the point of seizure may be calculated in pounds per square inch of bearing pressure.

After the seizure point has occurred, or the test has otherwise been completed, the platform 106 is lowered so as to swing the tray 108 out of the way and enable the operator to examine the bearing pin and bearing blocks. New bearing pins and bearing blocks are, of course, used for each lubricant test.

As is obvious, other testing procedures may be carried out using the machine of my invention. It is possible, for instance, instead of running the machine until actual seizure occurs, to run the machine at a given load for a certain length of time and then observe the amount of wear on the bearing blocks. By proper calculation, the actual load in pounds per square inch can be computed from the gauge reading of the load and the area of wear on the faces of the bearing blocks.

Where the machine is operated at an initially fixed load, it will be observed that the amount of wear on the bearing blocks can be detected by the falling off in the load indicated on the load dial or gauge 81. The following procedure has been developed for computing the amount of wear:

The machine is set up as previously described and run for 1 minute at a gauge load of 250 pounds with the ratchet arm 33 disengaged. The ratchet is then reengaged and the load run up to 500 pounds and kept there with the ratchet disengaged for 1 minute. The ratchet is then again engaged, the machine run up to 750 pounds and continued at this load for another minute with the ratchet disengaged.

At a very definite load during this test, the jaw load gauge will fall off a noticeable amount by the end of the 1 minute period. When the ratchet is reengaged, it is possible to count the teeth, or clicks, to bring back the load to the same point noted at the beginning of the 1 minute period. For example, assume that at 1500 pounds, the load falls off approximately 50 pounds in the 1 minute interval. After attaching the ratchet for the next load application, the number of teeth, or clicks, required to bring the load gauge back to exactly 1500 pounds is noted. If it be assumed that 8 teeth is the number of teeth required and each tooth corresponds to a wear of 0.000067 inch, the amount of wear can be computed by simply multiplying the wear for 1 tooth by the number of teeth that the wheel 62 must be advanced to bring the load back to the initial figure. The ratchet wheel 62 thus serves as an indexed member to indicate wear.

It will be noted that pronounced wear occurs at and immediately following the incipient seizure point. This is the limit of load that an oil can carry in service without wear resulting.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A lubricant testing machine, comprising a pin, means for revolving said pin, opposed bearing blocks having V-shaped notches for receiving said pin in line bearing contact with the walls of said notches, means operated by the pin revolving means for increasing the pressure of said bearing contact, a receptacle for containing a lubricant to a depth sufficient to immerse said bearing blocks and the encompassed portion of said pin, means for indicating the pressure of said bearing contact, and means for indicating the torque produced by relative movement between said pin and bearing walls of said blocks.

2. A lubricant testing machine, comprising a pin, opposed bearing blocks having V-shaped notches for receiving said pin in bearing contact with the walls of said notches, a receptacle for containing a lubricant to a depth sufficient to immerse said bearing blocks and the encompassed portion of said pin, means for revolving said pin, means operated by said pin revolving means for automatically increasing the pressure of said bearing contact by small increments, means for indicating the pressure of said bearing contact, and means for indicating the torque produced by relative movement between said pin and bearing walls of said blocks.

3. A lubricant testing machine comprising a vertically positioned pin, opposed self-adjusting bearing blocks having V-shaped notches for receiving said pin in line bearing contact with the walls of said notches, a receptacle for containing a lubricant to a depth sufficient to immerse said bearing blocks and the encompassed portion of said pin, means for revolving said pin at various predetermined speeds, means operated by said pin revolving means for automatically increasing the pressure of said bearing contact by small increments, means for indicating the pressure of said bearing contact, and means for indicating the torque produced by relative movement between said pin and bearing walls of said blocks.

4. A lubricant testing machine, comprising a vertically disposed pin, opposed bearing blocks having V-shaped notches presenting plane surfaces in contact with said pin, balls disposed behind said bearing blocks and adapted to so adjust said blocks that a plane passing through the centers of said balls also passes through the axis of said pin and the lines of convergence of said plane surfaces.

5. In a lubricant testing machine, a pin, blocks having V-shaped notches providing angularly disposed plane surfaces bearing against opposite portions of said pin, means for immersing the bearing surfaces in a lubricant to be tested, means for revolving said pin, and means operated by the pin revolving means for applying balanced forces through said blocks against said pin to increase the bearing pressure therebetween.

6. In a lubricant testing machine, a vertically disposed cylindrical pin, blocks having V-shaped notches providing angularly disposed plane surfaces bearing against opposite portions of said pin, means for immersing the bearing surfaces in a lubricant to be tested, means for revolving said pin at a predetermined speed, and means operated by the pin revolving means for applying balanced forces through said blocks against said pin to increase the bearing pressure therebetween.

7. A lubricant testing machine, comprising a vertical driven shaft, a bearing pin secured in one end thereof to depend therefrom, a shear pin securing said bearing pin in said shaft end, notched bearing blocks having angularly disposed plane surfaces contacting opposite portions of said bearing pin to initially make line contact with said pin, means operated by said driven shaft for applying increasing pressure through said blocks against said bearing pin, means for immersing said bearing surfaces in a lubricant to be tested, means for indicating the bearing pressure, and means for indicating the torque set up by the friction between the bearing surfaces of said bearing pin and blocks.

8. A lubricant testing machine, comprising a vertical driven shaft, a bearing pin secured in one end thereof to depend therefrom, a shear pin securing said bearing pin in said shaft end, notched bearing blocks having angularly disposed plane surfaces contacting opposite portions of said bearing pin, means for automatically applying increasing pressure through said blocks against said bearing pin, means for immersing said bearing surfaces in a lubricant to be tested, means for indicating the bearing pressure, and other means including a fluid filled sylphon and a gauge connected thereto for indicating the torque set up by the friction between the bearing surfaces of said bearing pin and blocks.

9. In a lubricant testing machine, a vertically disposed driven bearing pin, means for applying a measured bearing pressure thereagainst balanced with respect to the axis of said pin, said means comprising a pair of notched bearing blocks contacting opposite portions of said pin, self-adjusting centering members for said blocks, a pair of arms pivoted respectively at adjacent ends and diverging therefrom, the pivots of said arms carrying said bearing blocks from positions near the axes of said pivoted ends, said arms being bifurcated at their divergent ends, a threaded shaft freely extending through said bifurcated ends, members threadingly engaged by said shaft on said extended ends, a compression spring confined between one bifurcated end and the member threaded on the shaft end extending therebeyond, a gauge mechanically connected to said spring to indicate the compressive force applied thereto, and means for rotating said shaft to draw said divergent ends closer together and thus increase the bearing pressure exerted against said bearing pin.

10. In a lubricant testing machine, a vertically disposed driven bearing pin, means for applying a measured bearing pressure thereagainst balanced with respect to the axis of said pin, said means comprising a pair of notched bearing blocks contacting opposite portions of said pin, self-adjusting centering members for said blocks, a pair of arms pivoted respectively at adjacent ends and diverging therefrom, the pivots of said arms carrying said bearing blocks from positions near the axes of said pivoted ends, said arms being bifurcated at their divergent ends, a threaded shaft freely extending through said bifurcated ends, members threadingly engaged by said shaft on said extended ends, a compression spring confined between one bifurcated end and the member threaded on the shaft end extending therebeyond, a gauge mechanically connected to said spring to indicate the compressive force applied thereto, a ratchet wheel carried by said threaded shaft and fixed thereon, a driven shaft carrying said bearing pin, and an arm eccentrically connected to said driven shaft and carrying a pawl for engagement with said ratchet wheel for rotating said ratchet wheel shaft to draw said divergent ends closer together and thus increase the bearing pressure exerted against said bearing pin.

11. In a lubricant testing machine, a driven shaft, a vertically disposed driven bearing pin, bearing blocks in bearing contact with said pin, jaw arms carrying said bearing blocks, said jaw arms being pivoted for movement towards and away from each other and as a whole for pivotal movement about the axis of said bearing pin, means operated by said driven shaft for placing a load in step by step manner upon said jaw arms to exert a bearing pressure against said bearing pin, and means responsive to the pivotal movement of the jaw arms as a whole for measuring the torque produced by the friction set up by said bearing pressure.

12. In a lubricant testing machine, a driven shaft, a vertically disposed driven bearing pin, bearing blocks in bearing contact with said pin, jaw arms carrying said bearing blocks, said jaw arms being pivoted for movement towards and away from each other and also pivoted as a whole for movement about the axis of said bearing pin, means operated from said driven shaft for placing a load in step by step movement upon said jaw arms to exert a bearing pressure against said pin, and a gauge operatively connected to said jaw arms and responsive to pivotal movement of said arms as a whole for measuring the torque produced by the friction set up by said bearing pressure.

13. In a lubricant testing machine, a vertically disposed driven bearing pin, bearing blocks in bearing contact with said pin, jaw arms carrying said bearing blocks, said jaw arms being pivotally mounted for movement with respect to each other and also mounted for pivotal movement as a whole about the axis of said bearing pin, means for pivotally swinging said jaw arms for placing a load in step by step manner upon said jaw arms to exert a bearing pressure against said pin, and a sylphon and a gauge operatively connected by said sylphon to said jaw arms and responsive to pivotal movement of said arms as a whole for measuring the torque produced by the friction set up by said bearing pressure.

14. In a lubricant testing machine, a driven shaft, a bearing pin carried thereby, jaw members for applying a bearing pressure against said pin, means for applying a load on said jaw members to increase said bearing pressure by successive small increments, said means including a threaded shaft connecting ends of said jaw members, a ratchet wheel carried by said threaded shaft, an arm eccentrically connected to said driven shaft and a pawl carried by said arm for engagement with said ratchet wheel.

15. In a lubricant testing machine, a rotatably driven pin, bearing blocks having V-shaped notches presenting opposed plane bearing faces for contact with said pin, and means including self-adjusting holders for centering said blocks for applying a balanced bearing load through said faces against said pin.

16. In a lubricant testing machine, a rotatably driven pin, bearing blocks having V-shaped notches presenting opposed plane bearing faces for contact with said pin, means including self-adjusting holders for centering said blocks for applying a balanced bearing load through said faces against said pin, a gauge for registering the load so applied, and an indexed member constituting a part of said load applying means and responsive to the wear on said bearing faces to indicate the amount of such wear during continued application of a bearing load.

17. In a lubricant testing machine, a rotatably driven pin, bearing blocks for contact with said pin, means including self-adjusting holders for centering said blocks for applying a balanced bearing load against said pin, a gauge for registering the load so applied, and an indexed member constituting a part of said load applying means and responsive to the wear on said bearing faces to indicate the amount of such wear during continued application of a bearing load.

18. In a lubricant testing machine, a driven cylindrical member, bearing blocks having plane bearing faces for contact with said member, self-centering holders for said blocks, lever arms pivotally mounted at adjacent ends and having divergent free ends, the pivots of said arms carrying said block holders, means connecting said free lever ends to draw said lever arms toward each other and to apply a bearing load through said blocks against said cylindrical member, means for measuring the bearing load so applied, and an indexed member associated with said connecting means for indicating the wear on said blocks under given load.

19. In a lubricant testing machine, a driven pin, bearing blocks having V-shaped notches presenting opposed plane bearing faces for contact with said pin, holders for self-adjustably centering said blocks with respect to said pin, lever arms pivotally mounted at their adjacent respective ends and having divergent free ends, the pivots of said arms carrying said holders, load applying means including an indexed member and a compression spring associated with said free lever ends, means for driving said pin and capable of acting through said load applying means to draw said free lever ends toward each other to compress said spring and to apply a bearing load through said block against said pin, and a gauge actuated by the compression effect on said spring to indicate the amount of such load, said indexed member being responsive to the amount of wear on said bearing faces to indicate the same during the testing operation.

20. In a lubricant testing machine, a driven cylindrical member, bearing blocks having bearing faces for contact with said pin, holders in which said blocks are self-adjustably mounted, pivotally mounted jaw arms the pivots of which carry said blocks, and means for drawing said jaw arms toward each other to apply a pressure load through said block bearing faces to said cylindrical member, said means including a device indexed to indicate the extent to which said jaw arms are brought toward each other during the application of a bearing load whereby the amount of wear on said bearing faces may be determined during operation of the machine.

21. In a lubricant testing machine, a driven cylindrical member, bearing blocks having V-shaped notches providing plane bearing faces for contact with said pin, holders in which said blocks are self-adjustably mounted and automatically centered with respect to said cylindrical member, pivotally mounted jaw arms the pivots of which carry said blocks, and means for drawing said jaw arms toward each other to apply a pressure load through said block bearing faces to said cylindrical member, said means including a toothed wheel to indicate the extent to which said jaw arms are brought toward each other during the application of a bearing load whereby the amount of wear on said bearing faces may be determined during operation of the machine.

22. In a lubricant testing machine, a driven pin, a pair of bearing blocks in contact with said pin, self-adjusting holders for centering said blocks with respect to said pin, a pair of lever arms pivoted at adjacent ends and divergent therefrom, the pivots of said arms carrying said holders, and means for drawing said arms toward each other to apply a bearing load through said holders and blocks against said pin.

MEAD CORNELL.